(12) United States Patent
Bruke

(10) Patent No.: US 6,357,577 B1
(45) Date of Patent: Mar. 19, 2002

(54) CONVEYOR ARRANGEMENTS WITH MULTIPLE SHAFTLESS SCREWS

(75) Inventor: Richard Bruke, Bunkeflostrand (SE)

(73) Assignee: Spirac Engineering AB, Malmo (SE)

( * ) Notice: Subject to any disclaimer, the term of this patent is extended or adjusted under 35 U.S.C. 154(b) by 0 days.

(21) Appl. No.: 09/381,732

(22) PCT Filed: Mar. 31, 1998

(86) PCT No.: PCT/SE98/00591

§ 371 Date: Sep. 22, 1999

§ 102(e) Date: Sep. 22, 1999

(87) PCT Pub. No.: WO98/43899

PCT Pub. Date: Oct. 8, 1998

(30) Foreign Application Priority Data

Apr. 2, 1997  (SE) .............................. 9701191

(51) Int. Cl.⁷ .............................................. B65G 37/00
(52) U.S. Cl. ...................................... 198/625; 198/663
(58) Field of Search ................................ 198/513, 607, 198/608, 625, 663, 669

(56) References Cited

U.S. PATENT DOCUMENTS

| | | | | |
|---|---|---|---|---|
| 2,048,870 A | * | 7/1936 | Kannee | 198/625 X |
| 2,173,414 A | * | 9/1939 | Fulton | 198/625 X |
| 3,549,000 A | | 12/1970 | Christian | 198/64 |
| 3,707,224 A | | 12/1972 | Rastion | 198/213 |

(List continued on next page.)

FOREIGN PATENT DOCUMENTS

| | | | | |
|---|---|---|---|---|
| DE | 1756904 | | 10/1970 | |
| DE | 2054314 | | 5/1971 | |
| DE | 2330225 | * | 1/1975 | 198/663 |
| DE | 2905665 | | 8/1979 | |
| DE | 3315946 | | 11/1984 | |
| DE | 3833980 | | 4/1990 | |
| FR | 2162240 | | 7/1973 | |
| FR | 2380204 | | 9/1978 | |
| GB | 2015958 | | 9/1979 | |
| SE | 449852 | | 5/1987 | |
| SE | 461975 | | 4/1990 | |
| SE | 464080 | | 3/1991 | |

OTHER PUBLICATIONS

English translation of Claim 1 of DE 2905665 dated Aug. 16, 1979.
English translation of abstract of DE 3315946 dated Nov. 8, 1984.
English translation of abstract of DE 3833980 dated Apr. 12, 1990.

(List continued on next page.)

Primary Examiner—James R. Bidwell
(74) Attorney, Agent, or Firm—Ladas & Parry

(57) ABSTRACT

The present invention relates to a vertical conveyor (2) with double spirals (21, 31). The vertical conveyor (2) consists of a casing (20) and two shaftless spirals (21, 31). The spirals (21, 31) are driven each by a motor (24) via a gear and journal unit (25). The motors (24) are placed at the one short end of the vertical conveyor (2). The inlet (22) and outlet (23) of the conveyor (2) are disposed on opposite sides of the casing (20). The spirals (21, 31) are driven in opposite directions in such a manner that the material is "drawn" in at the inlet (22), while being "pressed" out at the outlet (23). This takes place thanks to the material being subjected to force components from the two spirals (21, 31) which act in the directions of the inlet (22) and the outlet (23), respectively. In a number of embodiments, a stationary shaft (33) is disposed within the spirals (21, 31) at least in the region of the inlet (22). Opposite the inlet (22), the casing (20) merges in wedge form (26) between the spirals (21, 31). The casing (20) is normally open between the two spirals (21, 31). The vertical conveyor (31) is often fed by a substantially horizontal conveyor (1).

10 Claims, 5 Drawing Sheets

U.S. PATENT DOCUMENTS

| | | | |
|---|---|---|---|
| 3,862,594 A | 1/1975 | Stolting et al. | 100/95 |
| 4,690,267 A * | 9/1987 | Gradoboev et al. | 198/625 X |
| 5,000,307 A | 3/1991 | Bruke | 198/608 |
| 5,000,900 A | 3/1991 | Baumgartner | 264/211.23 |
| 5,368,153 A | 11/1994 | Bruke | 198/608 |
| 5,562,029 A | 10/1996 | Bruke | 100/95 |

OTHER PUBLICATIONS

English translation of Claim 1 of FR 2380204 dated Sep. 8, 1978.

English translation of abstract of SE 449852 dated May 25, 1987.

* cited by examiner

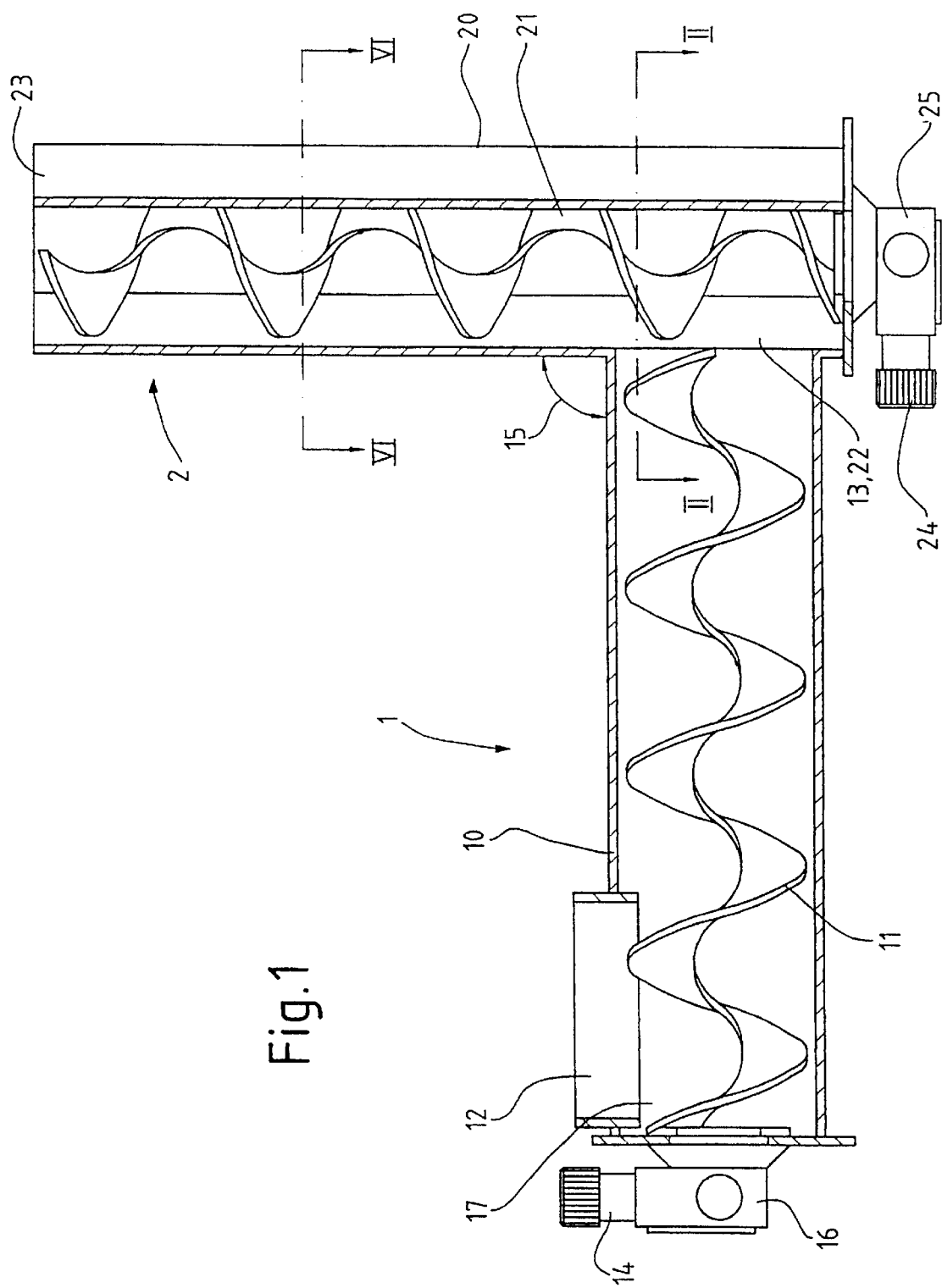

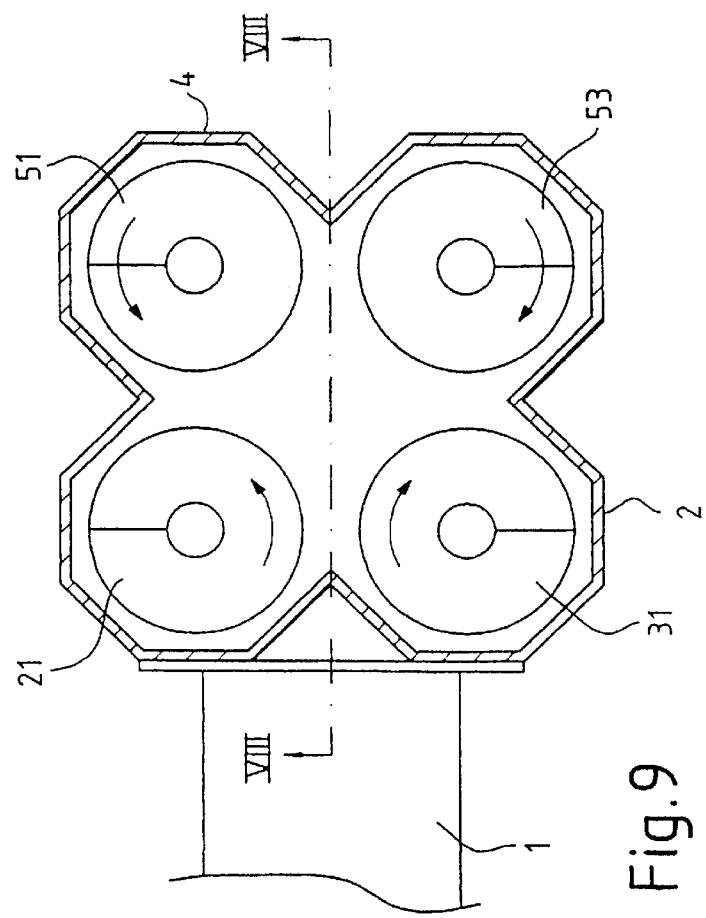
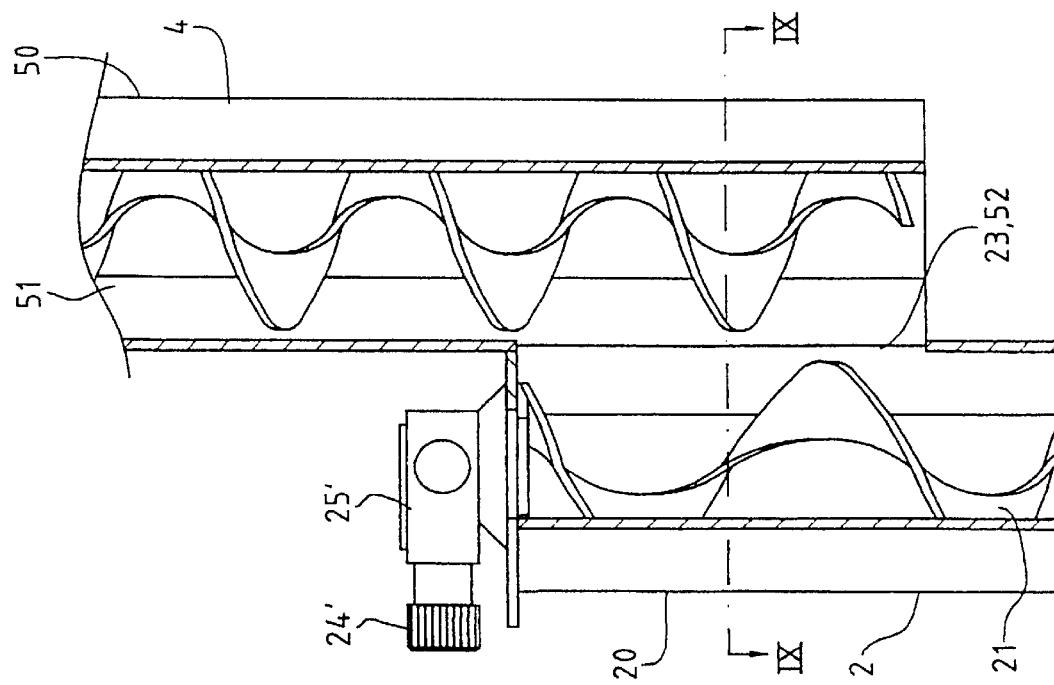
Fig. 9
Fig. 8

CONVEYOR ARRANGEMENTS WITH MULTIPLE SHAFTLESS SCREWS

The present invention relates to a device for conveying material in accordance with the preamble to appended Claim 1.

In many contexts, there is a need to displace material, for example bulk material, and, in such instance, not only homogeneous material but also material which includes components of different sizes, densities, elasticities, moisture content etc. Examples of such materials are grain, refuse, wood chips, coal, coke, dewatered sludge, pellets, flue ash, pulverulent material, paper pulp, fibre materials, etc. In many practical applications, it also applies that such displacement take place from a lower level to a higher level. In this instance, for reasons of space it is often important that such displacement take place substantially vertically or in a steeply inclining path.

Conventional screw conveyors provided with a mechanical shaft and which are utilised as vertical or steeply inclining conveyors suffer from a number of drawbacks. They have a low degree of efficiency and must, therefore, operate at high speeds, normally exceeding 100 rpm, and often up to 300 rpm. This high speed results in considerable energy consumption and often leads to rapid wear. The rigid, fixedly journalled construction and the limited space between threads, shaft and the wall of the casing all entail that material may readily become stuck and that the conveyor has relatively slight throughput capacity. The rotary shaft renders impossible the transport of material which may become wrapped around the shaft. Damp, tacky material readily dries on the inner wall of the casing and constantly reduces the free space between the screw and its casing. Thus, it is well known in the art that the rotation of the screw may be impeded or prevented by this phenomenon.

A spiral or helix provided with a shaft affords no homogeneous filling, which gives rise to vibrations. Sludge and similar material are often not conveyed in a uniform flow but inca random intermittent flow. The unhomogeneous filling and high speed of rotation of the spiral give rise to vibrations when the material is thrown against the walls of the conveyor. This results in severe wear on linings and operational disruption.

The above-outlined drawbacks in vertical screw conveyors provided with a shaft have the effect that conveyors for the displacement of material between different levels are built with relatively slight sloping angle, which naturally implies greater space requirements.

A device according to our European patent No. 0 314 752 provides a satisfactory solution to above-outlined problems and consists of a first, substantially horizontal conveyor consisting of a spiral or helix in a surrounding casing which conveys material to a substantially vertical conveyor, similarly consisting of a spiral in a surrounding casing. In order to increase the capacity of the substantially vertical conveyor section, two parallel spirals are disposed in the vertical casing according to the present invention.

Double spirals give a number of advantages compared with a single spiral. In order to obtain the same conveyor capacity with a single spiral as with double spirals, the single spiral must either be made considerably larger or the speed of rotation must be increased. Increased speed of rotation results in the above-outlined problems in respect of wear and energy consumption. A larger spiral will be considerably heavier which in turn results in additional problems such as increased loading on bearings, the need for larger drive motors, gear wheels etc. and also greatly increased energy consumption. It is, moreover, easier to obtain a symmetric infeed in double-spirals than if only a single spiral is employed. The double spirals support the infeed and discharge in that the spirals rotate in different directions and that the inlet and outlets, respectively, are disposed on opposite sides. This entails that the rotation of the spirals has an induction action on the material at the inlet end and an expulsion action at the outlet end. In those embodiments which have no wall between the spirals, the risk of blockage is moreover reduced and conveyance of individual larger pieces of material is made possible.

It generally applies that, in a screw conveyor with a mechanical shaft, or in a screw conveyor without mechanical shaft, conveyance takes place in that the conveyed material abuts against and slides along the drive surface of a thread which makes an oblique angle with the direction of transport. If this relative displacement between the material and the drive surface does not take place, i.e. if the material adheres to the thread, no material displacement whatever will take place in a direction towards the discharge end of the conveyor, but material instead rotates around with the thread in a circular movement. In order for a displacement towards the discharge end of the conveyor to be able to take place, it is thus necessary that the displacement of the material in the circumferential direction of the thread is arrested such that the thread, on its rotation, displaces the material towards the discharge opening. The frictional forces between the conveyed material and the rotating thread should, in other words, be less than between the material and the stationary casing, in order for the material to be displaced in a direction towards the discharge end.

It will readily be perceived that, in a vertical or steeply sloping conveyor which is composed of a casing surrounding threads provided with a shaft, the forces with which the material are pressed against the casing will generally be less than the forces with which the material adheres to the threads and the centre shaft. If no special measures are implemented to compensate for this situation, this will have as a result that the frictional forces between the conveyed material and the vertical casing will be less than the frictional forces between the material and the rotating devices. In order to create the conditions for conveying material towards the discharge end, the friction between the material and the casing must consequently be increased. According to prior art technology (a spiral provided with shaft), this is achieved by selecting a high speed of rotation for the screw and, with the aid of centrifugal force, throwing the material against the casing of the conveyor. As a result, these vertical screw conveyors operate, as has already been mentioned, at high speeds, which entails disadvantages such as high power consumption and severe wear, as well as low filling and/or efficiency degree. The low level of filling results often in the situation that only 15-20 percent of the volume of the casing is used, which entails a poor degree of efficiency and also uneven upward conveyance (for example lumping together of sludge). This causes extreme vibrations which result in noise, damage to the conveyor and its anchorage points.

A conventional screw conveyor has a threaded centre shaft. The total surfaces of the threads and the shaft together with the channel-like design of the space between the threads, results in the material readily adhering to the screw and rotating with it, which emplies that no displacement of material takes place in a direction towards the discharge end of the conveyor. There will be an increase of the frictional forces between the material and the screw as a result of the centre shaft of the rotating screw, the shaft also rendering impossible the conveyance of material which may be wrapped round the shaft and, moreover, considerably restricting the possibilities of conveying large pieces of material. A shaftless spiral has a considerably smaller total surface exposed to the material which is to be conveyed.

In a vertical conveyor, the spiral does not normally abut against the casing, while in horizontal and inclining conveyors, the force of gravity results in the spiral coming into abutment against the casing. As a result, in a vertical conveyor there will normally be very slight wear on the spiral and the casing. Moreover, the conveyed material acts as a lining. A certain degree of movement is possible between the spirals, which, however, depends upon the nature of the material conveyed. In addition, different distances are required between casing and spiral, depending upon the material conveyed. As example, it might be mentioned that sludge requires a free play of approx. 5 mm between the spiral and casing, while other materials may require approx. 25 mm.

The present invention relates to a device which satisfies the. above-outlined requirements and obviates the above described drawbacks. According to the present invention, this is attained employing a device according to the characterizing clause of the appended independent claim.

Further expedient and important embodiments of the present invention are disclosed in the appended subclaims.

The present invention will now be described in greater detail hereinbelow, with reference to the accompanying drawings, in which:

FIG. 1 is vertical section through an apparatus including the conveyor according to the invention;

FIG. 8 shows the interconnection of two vertical conveyors and is a section taken along the line VIII—VIII in FIG. 9; and FIG. 9 is a section taken along the line IX—IX in FIG. 8.

Figure 2:
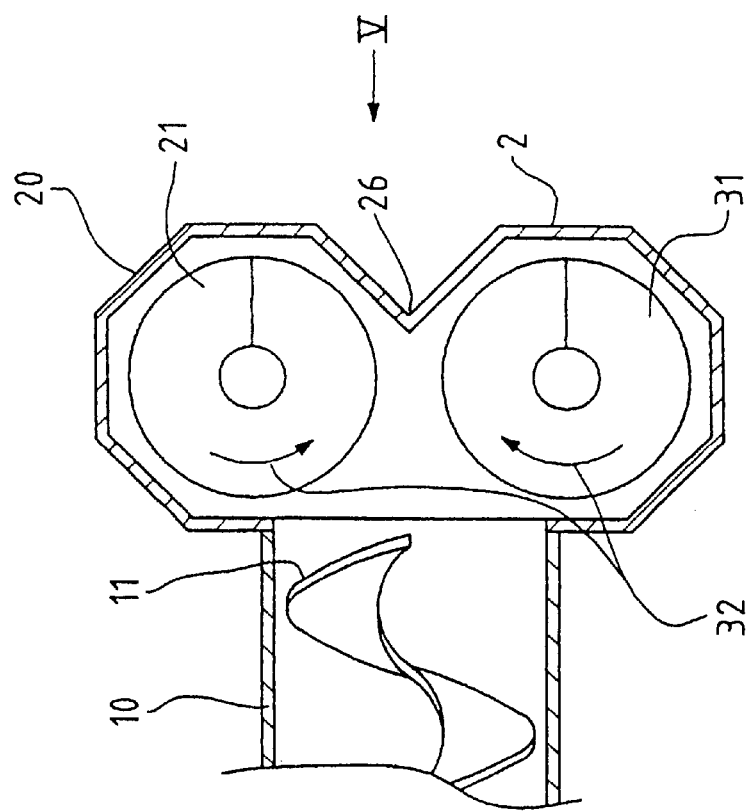
FIG. 2 is a cross-section taken along the line II—II in FIG. 1.

FIGS. 1 and 2 show a combination consisting of a horizontal conveyor 1 which feeds a vertical conveyor 2. The horizontal conveyor 1 comprises a casing 10 and a shaftless spiral 11 placed in the casing 10. The shaftless spiral is driven by a motor 14 placed at the one short end 17 of the casing 10. The motor 14 drives the spiral 11 via a gear and journal unit 16. At the same end 17 as the motor is placed, there is disposed an inlet 12 for receiving the material to be conveyed. At the other short end of the casing 10, there is disposed an outlet 13. The spiral 11 is only journalled in connection with the gear and journal unit 16, while the other end of the spiral 11 is completely free.

In one embodiment, the horizontal conveyor 1 has two parallel, shaftless spirals placed in the casing.

The vertical conveyor 2 consists of a casing 20 and two shaftless spirals 21,31. Both of the spirals 21,31 are each driven by a motor 24 via a gear and journal unit 25. The motors 24 which drive the two spirals 21,31 in the vertical conveyor 2 may be placed either beneath (FIG. 1) or at the top (FIG. 3), as a result of which they will be either compressive or tractive. That placing which is the most suitable is decided upon in each individual case, principally by the length of the conveyor, but also to some degree by the material which is to be conveyed and its nature. Even if one spiral 21,31 of the vertical conveyor 2 were to be stationary for some reason, the other spiral may continue to convey material. In another embodiment (not shown) use is made of the same motor for driving both of the spirals.

The spirals 21,31 are only journalled in connection with the gear and journal units 25, and their other ends are completely free. Both of the spirals 21,31 are disposed in parallel in the casing 20 and are driven in opposite directions 32. The vertical conveyor 2 has an inlet 22 in the form of an opening in the casing wall in connection with the outlet 13 of the horizontal conveyor 1 at the lower short end 29 of the casing 20. The outlet 23 of the vertical conveyor 2 is disposed at the upper short end 30 of the casing 20.

Figure 5:
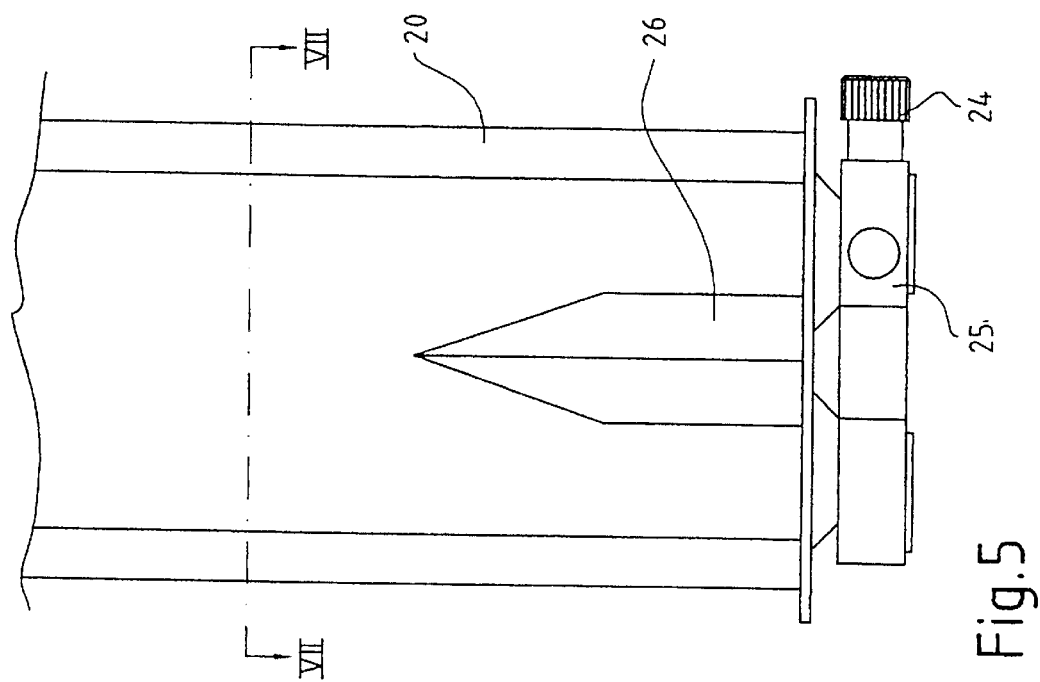
FIG. 5 shows an embodiment of a casing according to FIG. 2, seen in the direction of the arrow V.
Figure 7:
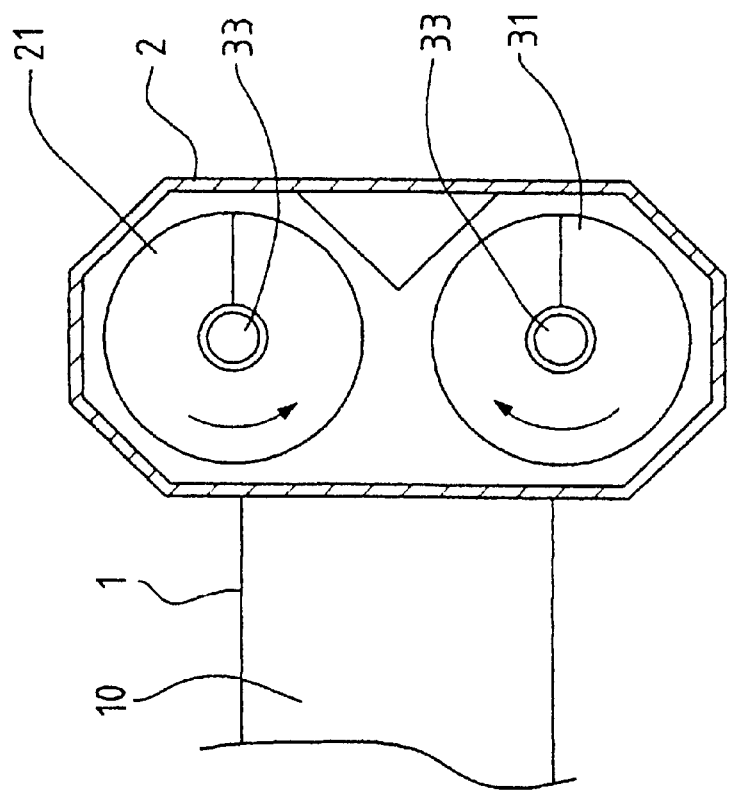
FIG. 7 shows a section corresponding to FIG. 6 taken along the line VII—VII in FIG. 5.
Figure 6:
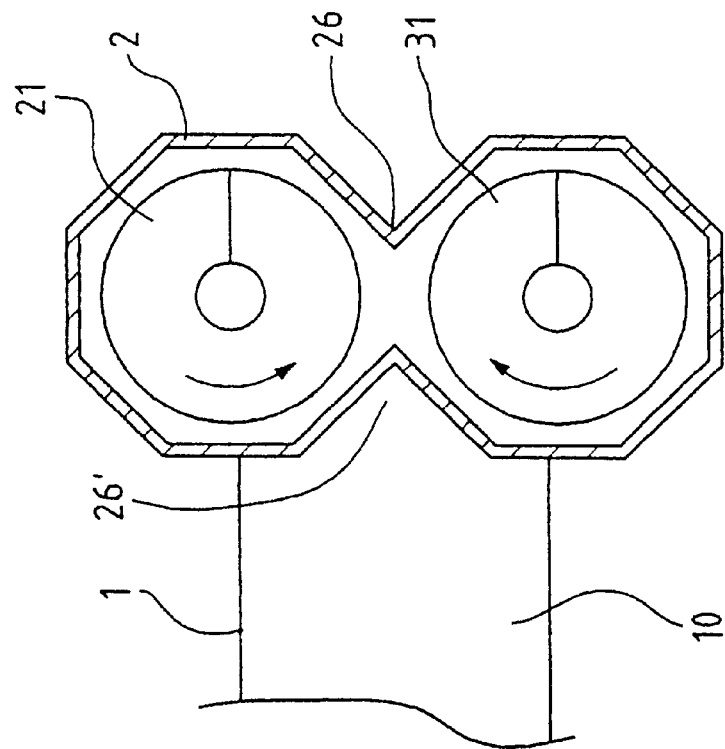
FIG. 6 shows a section taken along the line VI—VI in FIG. 1.

The casing 20 of the vertical conveyor 2 is preferably of polygonal cross-sectional configuration, i.e. a shape with straight edges and a multiplicity of corners, this cross-sectional configuration adhering to the configuration of the two spirals 21,31. At least in register with the inlet 22, the casing 20 enters into a wedge form 26 between the two spirals 21 and 31, and opposing to the inlet 22, as shown in FIGS. 5 and 7. In other embodiments, the casing 20 merges into a wedge form 26 all of the way between the spirals 21,31 on the side facing away from the horizontal conveyor 1, and on the opposite side, the casing 20 merges into a wedge form 26' above the inlet 22 (see FIG. 6).

The casing 20 is open between the spirals 21,31, at least in the region of the inlet. In most embodiments, the casing is open the entire way between the spirals, but there are also embodiments with a wall between the spirals 21,31.

The angle 15 between the horizontal conveyor and the vertical conveyor is a right angle in the illustrated embodiment, in other embodiments this angle may be as much as 110°. This reduces the risk that the conveyed material is clamped or jammed at the transition between the conveyors.

The expression "the spirals rotate towards one another" and similar expressions are taken to signify that the lower spiral 31 according to FIG. 2 rotates clockwise, while the upper spiral 21 rotates counter-clockwise, or in other words that the two spirals 21,31 in the middle of the casing 20 move in the direction of conveyance of the horizontal conveyor 1, i.e. from the inlet 22 towards the wedge 26 of the casing. As a result, material is "drawn" into the vertical conveyor at the inlet 22 in that the material is subjected to force components from both spirals which act in this direction. Given that the outlet 28 of the vertical conveyor 2 is disposed on the opposite side to the inlet 22, the material is "pressed" out at the outlet 29 with the aid of force components from both of the spirals.

The wedge forms 26,26' of the casing 20 are, in one embodiment, extended along the entire extent of the casing 20 on both sides. In other embodiments, the wedge form 26 is only extended flush with the inlet 22 or the wedge form 26,26' are extended in register with the inlet and subsequently continually recede in an upward direction as intimated in FIG. 5.

Figure 3:
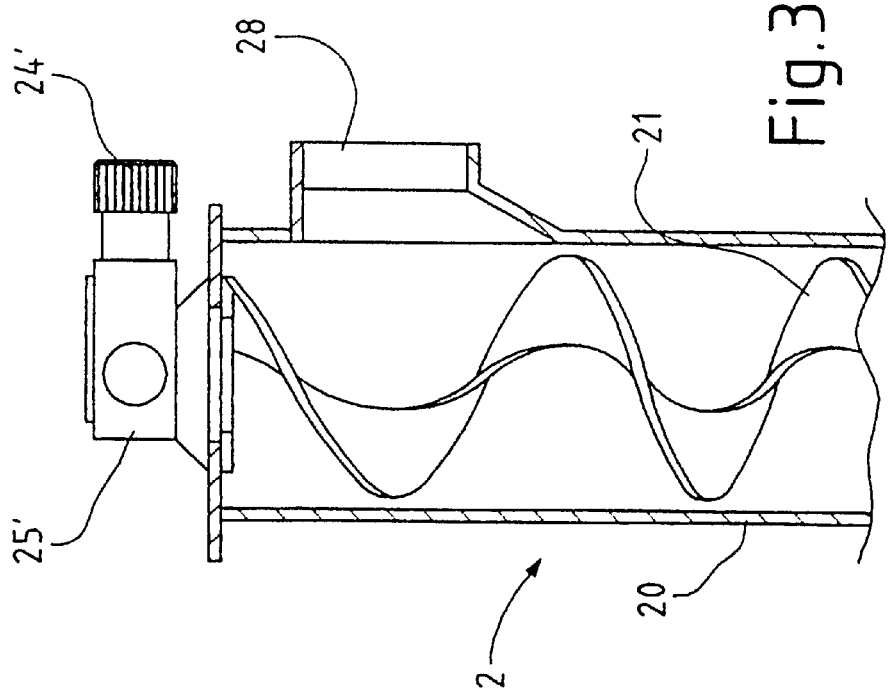
FIG. 3 shows an alternative embodiment of a portion of a device according to the present invention in vertical section.

FIG. 3 shows an alternative placing of the motors 24' and the outlet 28 of the vertical conveyor 2. The motors 24' and the gear and journal units 25' are, in this instance, placed at the upper short end 30 of the casing 20. In this embodiment, the outlet 28 has, in the form of a discharge funnel, been disposed to be lateral at the upper end 30 of the casing 20. In such instance, a special discharge device is generally provided in connection with the outlet. This discharge device has, in different embodiments, the form of a paddle, a counter-thread, or consists of the fact that the final thread turn of the spirals 21,31 is of greater pitch than the rest of the spirals. This greater pitch ensures that the material will have a greater force component in the lateral direction.

Material which is fed to the horizontal conveyor 1 through the inlet 12 is displaced by the rotation of the spiral 11 in the casing 10 in a direction towards the outlet 13 of the casing 1. From here, the material enters into the inlet 22 of the vertical conveyor 2 and in between the two spirals 21,31. In the casing 20 of the vertical conveyor, the spirals 21,31 rotate in different directions, in which event both of them have, in the centre of the casing, a component of movement in the same direction as the direction of conveyance of the horizontal conveyor 1, i.e. the spirals 21,31 assist the movement of the material being conveyed from the inlet 22 to the opposing wall of the casing 20. At this opposing wall, the casing 20 has a wedge form 26 so as to distribute the material being conveyed, but also to reduce the risk that the material being conveyed remains in this space. To some degree, the wedge form 26 also serves the function of guiding the spirals 21,31 so that they do not run the risk of jolting against one another, which could damage the spirals 21,31. In that the material being transported from the horizontal conveyor is fed in centrally in the casing 20 between the spirals 21,31, the risk will be further reduced that they jolt together, since the material being conveyed acts in a direction to press the spirals apart.

Material fed into the region of the inlet opening 22 in the casing 20 of the vertical conveyor forms material bridges with both material passing in and with material which is already in the casing 20. The material which surrounds the spirals abuts against the inner bounding definition of the casing and is prevented by friction from accompanying the spirals 21,31 in their rotation. This gives a relative movement between the two spirals 21,31 and the material. When, in such instance, the spiral threads pass through the material, this is lifted up and thereafter falls back down towards the lower end of the casing, when the spiral threads have passed. During the period of time when the material is lifted up by the spirals 21,31, material is moved from the outlet 13 of the horizontal conveyor into the cavities which are formed beneath the material raised by the threads in the casing 20 of the vertical conveyor, at the same time as the above-disclosed friction-promoting bridges are formed both beneath and above the thread blades of the spiral, between material which abuts against the thread blades and surrounding material. By successive relaying and insertion of material from the horizontal conveyor 1, the entire space will duly be filled out in the casing 20 of the vertical conveyor 2 with compacted material.

A precondition for the material to be lifted up is that the possibility of the material to accompany the spirals 21,31 in their rotation is reduced, which is achieved if the frictional forces between the material being conveyed and the rotating threads are less than between the material being conveyed and the stationary casing 20. By the supply of material which takes place with the first spiral 11 and, principally, into the cavities formed beneath the threads of the rotating second spirals 21,31, friction forces between the bodies of the material and between the material and its surroundings (including the inner bounding definition of the casing) are established, these forces being of a size and direction which entail that the material in the casing 20 of the vertical conveyor 2 will have a slower movement in the directions of rotation 32 of the spirals 21,31 than the spirals 21,31 themselves and at least in certain portions is arrested entirely. As a result, there will be formed a substantially continuous material body from the bottom of the casing, this material body being displaced towards the discharge end 30 of the casing 20. If the supply of material ceases through the outlet 13 of the first casing 10, it has proved that displacement of material in the vertical direction will also cease. This takes place thanks to the relatively slow speed whereupon, on rotation of the vertical spirals 21,31, there merely takes place a relaying of the material, but substantially no vertical displacement thereof. If the intention is to empty the vertical conveyor 2 of the material, it is possible to run the spirals 21,31 at high speed or to reverse the direction of rotation.

In a number of embodiments, a stationary shaft 33 is provided within each respective spiral in the region of the inlet 22 to the vertical conveyor 2. This is provided partly to prevent material from falling back into the centre of the spirals and partly for locking the lower end of the spiral from movement in the lateral direction if a tractive motor is employed, disposed at the upper end of the conveyor. In further other embodiments, the stationary shaft 33 is extended throughout the entire longitudinal extent of the spirals.

Figure 4:
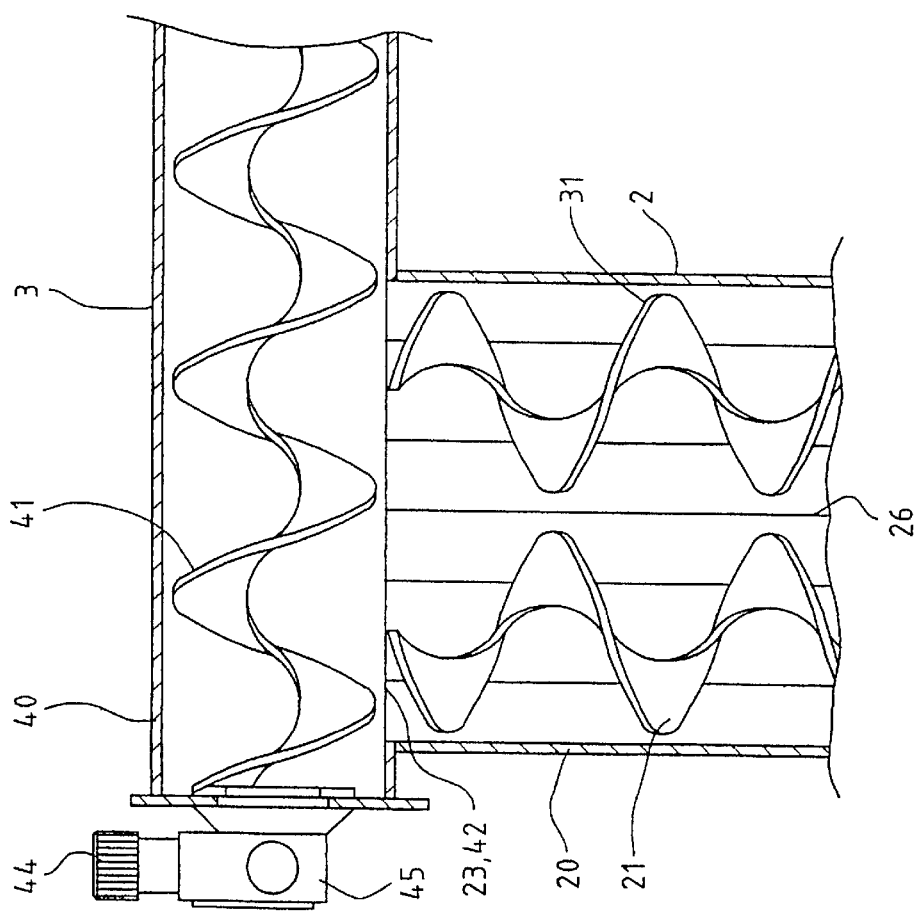
FIG. 4 shows a further alternative embodiment of a portion of a device according to the present invention in vertical section.

In the embodiment illustrated in FIG. 4, the outlet 23 of the vertical conveyor 2 is directly connected to the inlet 42 of a second horizontal conveyor 3. This horizontal conveyor 3 also consists of a casing 40 with a spiral 41 disposed therein, the spiral being, via a gear and journal unit 45, driven by a motor 44. The casing 20 of the vertical conveyor discharges from beneath into the casing 40 of the second horizontal conveyor 3. In such instance, the second horizontal conveyor 3 has greater conveyance capacity than the vertical conveyor 2. The infed material is thus displaced with the spiral 41 of the second horizontal conveyor 3 towards the discharge end of the conveyor. The outlet 23 of the vertical conveyor 2 is, in certain embodiments, centred in the second horizontal conveyor 3, i.e. the centre axes of the spirals 21,31,41 in each respective conveyor 2,3 lie in the same plane. In other embodiments, the outlet 23 is displaced from its centre, which gives an improved infeed adapted to the rotation of the second horizontal conveyor 3. In additional further embodiments, if, for example, the vertical conveyor 2 is provided with tractive motors, the vertical conveyor 2 has a side discharge which leads to a side infeed in the second horizontal conveyor 3.

The cross-sectional configuration of the casing 20 of the vertical conveyor 2 is adapted to suit that type of material which is to be conveyed. In such instance, it is important to ensure that there is sufficient friction between the wall of the casing and the material being conveyed in order for the displacement as disclosed in the foregoing to be able to take place. In order to obtain this sufficient friction, the cross-section in the illustrated embodiment is in the form of a polygon, in which the corners make friction-promoting disruptions in the cross-sectional configuration. In other embodiments, the casing is of circular configuration or oval cross-section, in which event the wall of the casing is normally provided with some friction-promoting agent, for example by a coating with suitable material, by the inlay of ribs, etc.

In that the two spirals 21,31 in the vertical conveyor 2 rotate towards one another in the conveyance direction of the first horizontal conveyor 1 and the inlet 22 is disposed centrally between the spirals 21,31, a disruption-free infeed is promoted to the vertical conveyor 2. This also entails that the incoming material acts on the spirals 21,31 with force components which are directed away from one another, as a result of which there is no risk that the two spirals are clamped together and possibly damaged.

The expression "substantially vertical" or "vertical" in respect of the vertical conveyor 2 is here taken to signify that the conveyor normally makes a right angle, 90°, with the horizontal plane, but that the angle is, in certain cases, as low as 75°. Expressed otherwise, the expression "substantially vertical" is taken to signify here an angle between 75° and 90° with the horizontal plane.

By only journalling the vertical spirals 21,31 in the one end via the gear and journal unit 25 while the other ends of the spirals are freely movable, the spirals 21,31 will be sufficiently flexible to avoid a clamping risk caused by individual hard material pieces in the material being conveyed. This clamp or block risk is also reduced in those embodiments which lack a wall between the vertical spirals which also makes possible the conveyance of pieces of material of larger dimension.

In the embodiment illustrated in FIGS. 8 and 9, the outlet 23 of the first vertical conveyor 2 is connected to the inlet 52 of a second vertical conveyor 4. This second vertical conveyor 4 also has two spirals 51,53 disposed in a casing 50. Since the second vertical conveyor 4 is of a construction corresponding to the first vertical conveyor 2, it will not be described in greater detail here. The action of connecting several vertical conveyors to one another in the above described manner is employed when the material is to be lifted a great distance.

A further advantage inherent in the present invention is that the wear on the vertical conveyor is slight, since the speed of rotation of the spirals is kept low and the spirals are not brought into abutment by force of gravity against the casing, as is the case in sloping conveyors.

The speeds of rotation of the different spirals 11,21,31, 41,51,53 may be adjusted to the desired values by modifying the gearing and/or the motor speeds. In such instance, it is important to ensure that the conveyance capacity of each respective conveyor 1,2,3,4 exceeds the capacity of the preceding conveyor so as to prevent material from being accumulated and compressed in the transition regions between the different conveyors. Such a compression may lead to severe mechanical stresses on both casing and spirals, which would need to be overdimensioned in the transition regions in order to provide the requisite mechanical stability.

The shaftless spirals which are employed in the present invention normally have a diameter which is less than 600 mm, and is normally 300–500 mm. The spirals are driven at a speed of rotation of, as a rule, 20–70 rpm, preferably 30–50 rpm. The speed of rotation which is selected principally depends on the material which is being conveyed. For material which is highly abrasive, speeds of 10–20 rpm are normally selected. The relatively low speed of rotation which is employed gives low energy consumption, slight wear and a low noise level, at the same time as the high degree of filling, as a rule close to 100%, entails high conveyance capacity and vibration-free operation. As a result of the symmetric loading to which the rotating spirals in a filled vertical conveyor are subjected, they will, under normal operational conditions, not come into contact with the surrounding casing. This means that wear on the casing is technically non existent and that the noise level is low.

What is claimed is:

1. A conveyor device (2), comprising a casing (20) with an outlet (23, 28) at an upper end and an inlet (22) at a lower end, wherein the conveyor device (2) has substantially vertical orientation; and two shaftless spirals (21, 23) are disposed in parallel with one another within the casing (20) of the conveyor device (2), said conveyors being laterally spaced from one another to provide a space therebetween, said casing extending around said conveyors and including wedge-shaped portions projecting into said space between said conveyors to provide friction with the material being conveyed in a region between the conveyors, wherein the spirals (21, 31) rotate in opposite directions and the casing (20) has a polygonal cross-sectional configuration with straight sides and a plurality of corners.

2. The conveyor device as claimed in claim 1, wherein the spirals (21, 31) are driven by motors (24) disposed at one of the short sides (29, 30) of the casing (20); and the spirals (21, 31) are journalled in one end.

3. The conveyor device as claimed in claim 1, wherein an inlet (22) and the outlet (23) of the substantially vertical conveyor (2) are disposed on opposite sides of the casing (20) in such a manner that the infeed discharge, respectively, are supported by the rotation of the spirals (21, 31).

4. The conveyor device as claimed in claim 1, wherein said wedge-shaped portion extends at least along a part of the extent of the spirals; the interior of the casing (20) is provided with friction-promoting means.

5. The conveyor device as claimed in claim 1, wherein the casing (20) is open in the region between the spirals (21, 31), at least in an infeed region; a stationary shaft (33) is disposed within each spiral (21, 31), each said shaft being extended at least along a distance corresponding to several thread turns past the inlet (22) of the casing (20); the inlet (22) is disposed to be centered in relation to the spirals (21, 31).

6. The conveyor device as claimed in claim 1, wherein the outlet (13) from a first substantially horizontal conveyor (1) is connected to the inlet (22) of the casing (20) of the substantially vertical conveyor (2); the first substantially horizontal conveyor (1) is in the form of a screw conveyor with one or two shaftless spirals (11); the angle (15) between the substantially vertical conveyor (2) and the first substantially horizontal conveyor (1) is between 80° and 110°; and the angle between the substantially vertical conveyor (2) and the horizontal plane is between 75° and 90°.

7. The conveyor device as claimed in claim 1, wherein the outlet (23) of the substantially vertical conveyor (2) is disposed straight up in the extension of the casing (20).

8. The conveyor device as claimed in claim 1, wherein the outlet (28) of the substantially vertical conveyor (2) is disposed laterally through an opening in a wall of the casing; and a special discharge device is provided for discharging material through the outlet (28).

9. The conveyor device as claimed in claim 7, wherein the outlet (23) of the substantially vertical conveyor (2) is connected to the inlet (42) of a second, substantially horizontal screw conveyor (3).

10. The conveyor device as claimed in claim 8, wherein the outlet (28) of the substantially vertical conveyor (2) is connected to the inlet (52) of a second, substantially vertical conveyor (4) which has two shaftless spirals (51, 53) disposed in parallel in a casing (50).

* * * * *